Sept. 25, 1956  R. S. BERKOWITZ  2,764,679

ABSOLUTE VALUE SYSTEM

Filed Aug. 27, 1952

*INVENTOR.*
RAYMOND S. BERKOWITZ

BY
*Harry M. Saragovitz*

United States Patent Office 2,764,679
Patented Sept. 25, 1956

2,764,679

ABSOLUTE VALUE SYSTEM

Raymond S. Berkowitz, Philadelphia, Pa., assignor to the United States of America as represented by the Secretary of the Army Application August 27, 1952, Serial No. 306,592

2 Claims. (Cl. 250—27)

This invention relates to computer circuits and more particularly to a circuit for obtaining a unidirectional output from an analog computer regardless of the phase of its input.

The analog computers operate on continuously varying physical magnitudes or data. They are limited by the errors of absolute magnitude or phase distortion in computers but are preferable over the digital computers where only three or four significant figures are being considered because of their considerably greater simplicity coupled with reasonable accuracy.

The computers to which this invention apply would be generally of the analog type wherein a reference input wave—presumably a sine wave—of alternating current is amplified or varied in amplitude by the various known or unknown functions entering into the computation. In the course of the action of electronic circuitry the phase of the original alternating current wave may be reversed several times without affecting the absolute value of the result. However, a reversal of phase of the input waveform in the computer would give a negative output if gating were synchronized to the input waveform.

It is therefore an object of this invention to provide a circuit that will give positive pulse output regardless of input.

It is an object of this invention to provide a circuit for gating the output of an A. C. computer so that positive pulses will always be obtained.

It is a further object of this invention to provide a circuit including a frequency doubler, differentiating network and rectifiers to provide a series of positive pulses to gate the output of an A. C. computer so that a positive sample of the absolute value of the output wave will always be fed into the measuring circuits.

Figure 1:
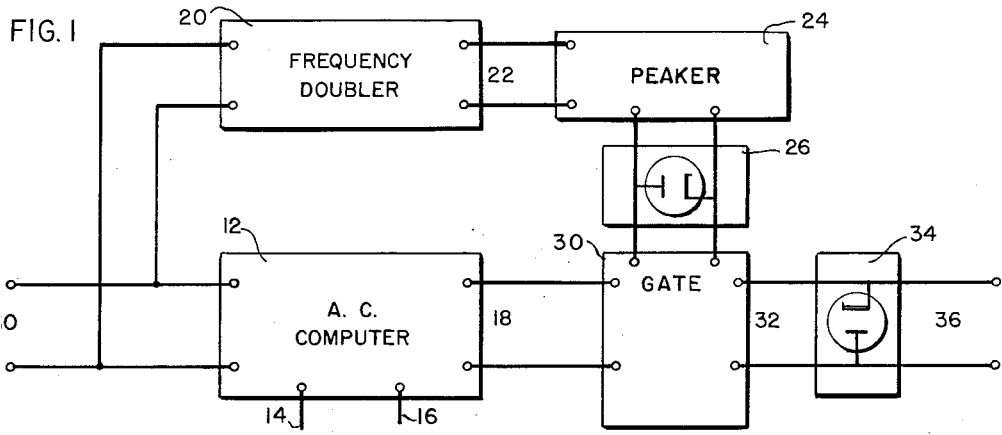
Figure 2:
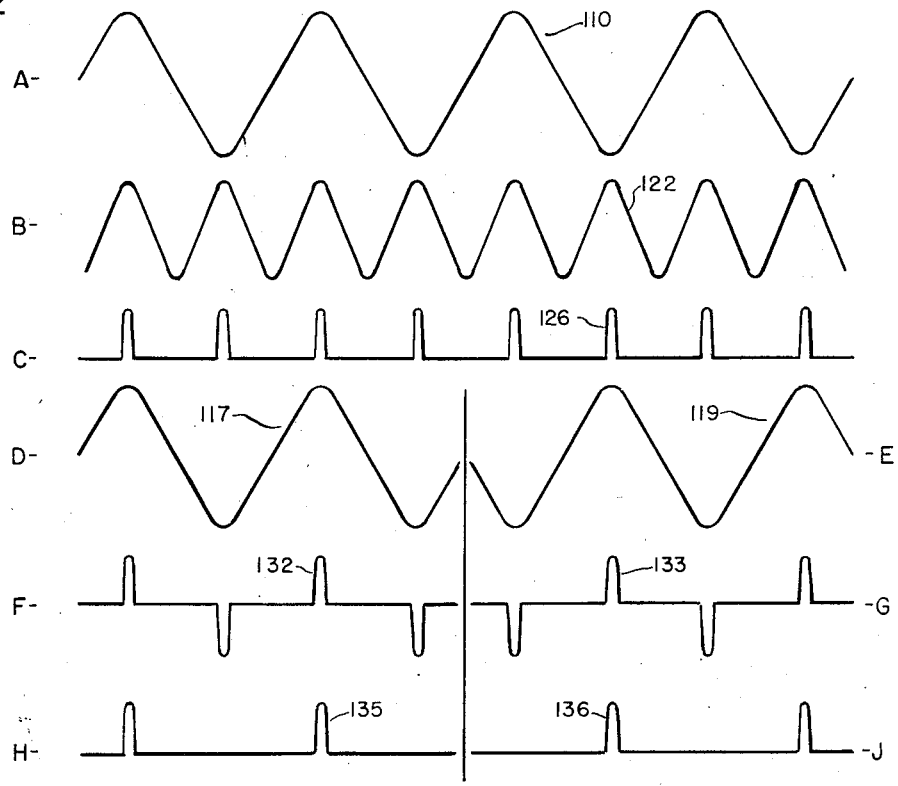

Other objects of this invention will be apparent from the following specification and the drawings in which, Fig. 1 is a block diagram of elements interconnected according to this invention, and Fig. 2 illustrates typical waveforms at various points in the circuit to clearly illustrate its operation.

Referring now to Fig. 1 of the drawings, an alternating current is applied at 10 to the computer 12. This alternating current may have a waveform such as shown by 110 in A of Fig. 2. The computer may have inputs such as 14 and 16 to receive the data entering into the computation. Mechanical data can be applied by any suitable device, such as a potentiometer, well known in the art and not shown here. The output of the computer is applied to the gate 30.

The input wave 110 is also applied to the frequency doubler 20 which may be any of several types well known to the art. The output of the frequency doubler at 22 could be a waveform such as 122 shown in B of Fig. 2. This may be applied to a peaker 24 to produce relatively sharp pulses in place of the normal peaks of the doubled waveform. Other means of producing relatively short pulses, such as a sine wave clipper and differentiator or multivibrator could also be used, as long as the pulses are positive and can be synchronized with the peaks of the original wave. Negative pulses can be eliminated by the diode 26, leaving a waveform such as 126 of Fig. 2C. This waveform is applied as a gating signal to the gating circuit 30.

Since the gate is actuated by the pulses 126, it will pass the peak signal at the output of the A. C. computer at each instant the gate is opened. The ouput of the A. C. computer, as mentioned earlier, will presumably have the same waveform as the input wave 110 but due to the inverting action of electronic valves it may be either a positive or negative phase relation such as seen in D or E of Fig. 2, waves 117 or 119 as compared with the input wave 110. The resultant output in each case would be as shown in F or G respectively. It can be seen from this that, if the gating impulses were only half as frequent and in phase with the input wave 110, the results would be positive in one case and negative the next, even though the absolute values were the same. However, since the output is now gated at twice the input frequency, both positive and negative pulses as shown in 132 and 133 will be obtained. The negative components of these pulses can be eliminated by diode 34 to obtain a positive peak value at the output 36 at all times as shown in 135 and 136 of H and J on Fig. 2.

This positive resultant may now be used as an input to a parametric computer or may be combined with data from other forms of computers.

What is claimed is:

1. In an analogue computer circuit, the combination comprising a computer network having an output circuit and an input circuit connected to a source of alternating current, a frequency doubler means having an output circuit and an input circuit connected to said source of alternating current, diode shunting means connected across the output circuit of said frequency doubler means, a gate circuit having an input circuit, an output circuit, and a control circuit, means connecting the output circuit of said computer network to said gate input circuit, means connecting the output circuit of said frequency doubler means to the control circuit of said gate circuit, and diode shunting means connected across the output of said gate circuit.

2. In an analogue computer circuit, the combination comprising a computer network having an output circuit and an input circuit connected to a source of alternating current, a frequency doubler means having an output circuit and an input circuit connected to a source of alternating current, a peaker circuit having an output circuit and an input circuit connected to the output of said frequency doubler means, a diode shunting means connected across the output circuit of said peaker circuit, a gate circuit having an input circuit, an output circuit, and a control circuit, means connecting the output circuit of said computer network to said gate input circuit, means connecting the output circuit of said peaker circuit to the control circuit of said gate circuit, and diode shunting means connected across the output of said gate circuit.

References Cited in the file of this patent

UNITED STATES PATENTS

| | | |
|---|---|---|
| 2,413,023 | Young, Jr. | Dec. 24, 1946 |
| 2,419,570 | Labin et al. | Apr. 29, 1947 |
| 2,426,497 | Field | Aug. 26, 1947 |
| 2,467,486 | Krumhansl et al. | Apr. 19, 1949 |
| 2,512,495 | Gray | June 20, 1950 |
| 2,517,579 | Levy | Aug. 8, 1950 |
| 2,566,085 | Green | Aug. 28, 1951 |
| 2,609,493 | Wilmotte | Sept. 2, 1952 |
| 2,688,077 | White et al. | Aug. 31, 1954 |
| 2,695,330 | Rynn | Nov. 23, 1955 |

FOREIGN PATENTS

| | | |
|---|---|---|
| 479,935 | Great Britain | Feb. 14, 1938 |